United States Patent [19]

MacRae et al.

[11] 4,002,466
[45] Jan. 11, 1977

[54] METHOD OF REDUCING ORES

[75] Inventors: Donald R. MacRae, Bethlehem;
Richard G. Gold, Coopersburg;
William R. Sandall, Bethlehem;
Charles D. Thompson; Peter G.
Cheplick, both of Bethlehem, all of
Pa.

[73] Assignee: Bethlehem Steel Corporation,
Bethlehem, Pa.

[22] Filed: Nov. 3, 1975

[21] Appl. No.: 627,993

[52] U.S. Cl. .................................. 75/11; 75/65 EB
[51] Int. Cl.² ......................................... C21C 5/52
[58] Field of Search ............................. 75/10–12,
75/65 EB

[56] References Cited

UNITED STATES PATENTS

| 3,390,979 | 7/1968 | Greene | 75/11 |
| 3,429,691 | 2/1969 | McLaughlin | 75/10 R |
| 3,852,061 | 12/1974 | Wulff | 75/10 R |
| 3,862,834 | 1/1975 | Von Waclawiczek | 75/11 |

Primary Examiner—Peter D. Rosenberg
Attorney, Agent, or Firm—Joseph J. O'Keefe; John I.
Iverson; Robert M. Jones

[57] ABSTRACT

Iron ore and a mixture of methane and hydrogen are fed into a plasma arc torch and form a swirling film of material that slowly descends the walls of the torch. The ore is reduced in the torch, and metallic iron is collected in a crucible below the torch.

5 Claims, 3 Drawing Figures

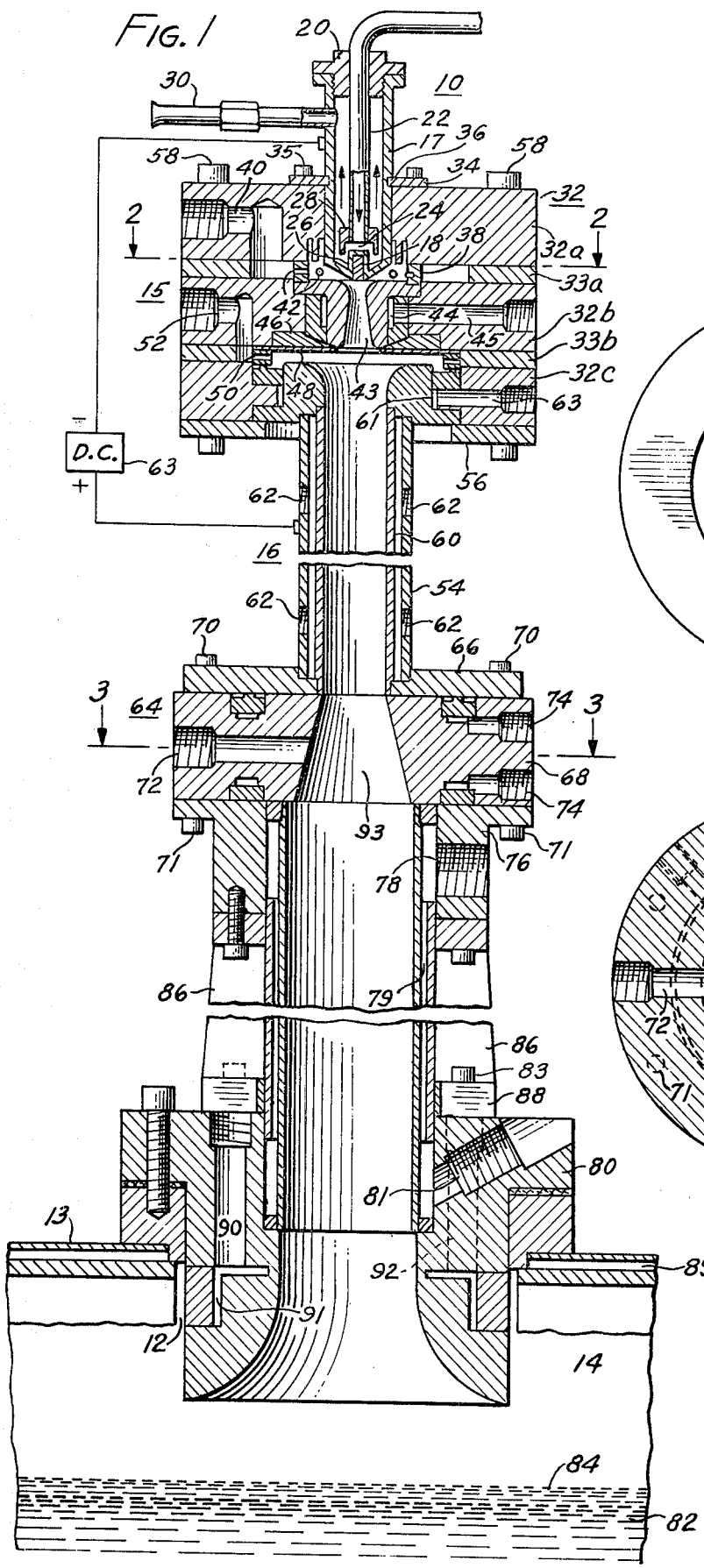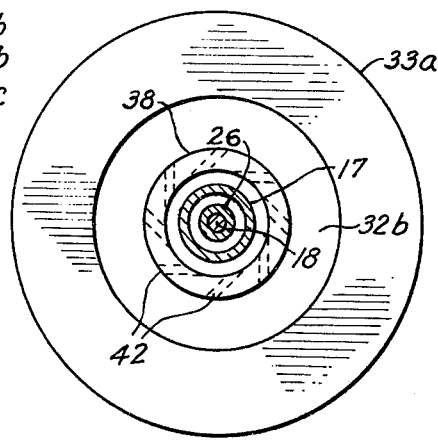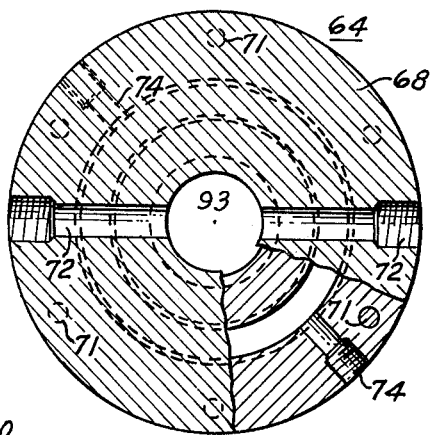

1

METHOD OF REDUCING ORES

BACKGROUND OF THE INVENTION

This invention relates to a method of reducing oxides and more particularly to a method of reducing iron ores in a plasma arc torch.

Conventionally, steel has been produced by a process comprising: (1) producing coke in batteries of coke ovens, (2) converting iron ore into pig iron by reacting the ore with the coke in a blast furnace, and (3) refining the pig iron into steel in an open hearth, basic oxygen, or electric furnace. The investment to produce steel by this route is enormous and requires a large annual capacity to be economically feasible.

However, there is a need for steel plants of relatively small annual capacity, and the attempt to satisfy this need has led to the development of direct reduction processes in which iron ore is reduced without the use of a blast furnace.

One process for directly reducing ore comprises: (a) introducing a mixture of solid particles of ore and a reductant into a plasma arc torch, typically including a cathode and an anode, and (b) entraining the mixture in the arc. Although this process has been successful in converting, for example, iron ore to steel, the problems are: (1) relatively rapid erosion of the anode, (2) excessive heat losses in the anode region, and (3) relatively high power consumption and relatively low reductant utilization per unit of ore reduced.

The object of the present invention is to provide a plasma arc torch reduction process that provides improved performance in terms of these three points.

SUMMARY OF THE INVENTION

We have discovered that the above object can be obtained by providing a plasma arc torch comprising a cathode and an anode and by introducing a swirling vortical stabilizing gas stream into the torch adjacent to the cathode and the anode. Solid particles comprising metal oxides are then introduced into the torch between the ends of the anode. These particles combine with the gas stream to form a vortical path swirling in the same direction as the gas stream. An arc is established between the cathode and the anode, the arc providing sufficient heat to convert the metal oxides into a film of material on the wall of the anode. The metal oxides are reduced by providing a reductant in contact with them during the formation of the film and thereafter. The effluent from the torch is subsequently collected in a receiving vessel.

BRIEF DESCRIPTION OF THE DRAWINGS

FIG. 1 is a vertical section through apparatus adapted to carry out the process of the invention.

FIG. 2 is a sectional view taken along lines 2—2 of FIG. 1.

FIG. 3 is a sectional view taken along the lines 3—3 of FIG. 1.

DESCRIPTION OF THE PREFERRED EMBODIMENT

As shown in FIG. 1, a plasma arc torch 10 is secured in an annular opening 12 in the roof 13 of a crucible 14. The torch 10 is annular in cross section and broadly comprises a cathode section 15 and an anode section 16, the cathode section comprising a copper annulus 17 having a thoriated tungsten button 18 at one end to provide a point of arc attachment. The other end of the annulus 17 is sealed with a copper plug 20 having a cooling tube 22 passing through it. The tube 22 is coaxial with the annulus 17 and terminates in an opening 24 adjacent to a recess 26 in the annulus 17 which houses the button 18. The tube 22 is also provided with a baffle 28 that directs the coolant supplied through the tube 22 toward the tungsten button housing. The wall of the annulus 17 has a second tube 30 connected to it through which coolant may leave the annulus.

The annulus 17 is fitted within a multisectioned insulating block 32 comprising upper section 32a, medial section 32b, lower section 32c, and spacer plates 33a and 33b. The annulus 17 is held in place by means of a split ring 34 fitted in a recess 36 in the periphery of the annulus and secured to the upper section 32a by a plurality of screws 35. Disposed below upper section 32a within spacer plate 33a is a gas ring 38 through which a gas is supplied to the torch 10 through a passageway 40 bored in the upper section 32a and through the space between the spacer plate 33a and the periphery of the ring 38. As shown in FIG. 2, the ring 38 is provided with a plurality of passageways 42 so that the gas is introduced into the torch tangentially. In order to prevent corrosion of the button 18, the gas must be nonreactive with thoriated tungsten and may be helium, hydrogen, argon, nitrogen or mixtures of these. The gas stabilizes the anode-to-cathode arc by flowing vortically about the top of the annulus 17 and downward along the inner walls of the torch.

A copper constrictor 43, electrically insulated from the cathode and anode, is preferably provided and is disposed directly below the cathode button 18. The constrictor is provided with a passageway 44 for receiving a coolant passing through a bore 45 into the medial section 32b and leaving the block through an exit bore, not shown for reasons of clarity. The constrictor 43 stabilizes the arc, increases the power generated per unit arc length, and prevents carbon-containing gases from the anode region from flowing back to the cathode region.

Below the constrictor 43 is an annular boron nitride shield 46 which protects the constrictor 43 and the insulating block from damage by heat from the arc. The shield 46 is secured in place by means of a steel disc 48.

Another anode-to-cathode arc-stabilizing gas is introduced tangentially into the torch 10 through a second gas ring 50. This secondary stabilizing gas is not essential but is preferred as it results in greater stabilization of the arc. The gas may be inert, e.g., argon, or may be a gas that reduces the ore to be processed, e.g., hydrogen, methane, or mixtures of both, and is supplied to the ring 50 through a passageway 52 bored into the medial section 32b, and through the space between the spacer place 33b and the periphery of the ring 50. The gas also forms a vortex flowing downward along the inner walls of the torch.

The upper end of an anode 54 is below the constrictor 43 amd is held in place by a split ring 56 secured to the lower section 32c by tie-rods 58. The anode 54 is provided with an annular cooling passageway 60, a plurality of inlets 62 by which a coolant may be circulated to and from the passageway 60, and an annular passageway 61 through which a coolant may ass via bores 63, only one of which is shown.

The cathode annulus 17 and the anode 54 are connected to the negative and positive sides, respectively, of a conventional power supply 63. The power supply preferably is a d.c. 2000 volt, 500 ampere supply.

Disposed intermediate between the ends of the anode 54 is an ore inlet section 64 comprising a cover plate 66 secured to an ore inlet ring 68 by machine screws 70. The ore inlet ring 68 is provided with a radially disposed inlet bore 72 and with coolant bores 74. The ring 68 is secured by machine screws 71 to a flange plate 76, which forms a portion of a coolant chamber comprising an inlet bore 78, an annular passageway 79, and an exit bore 81. The anode 54 is provided with reinforcing exterior members comprising web member 86 and flange 88. The lower end of the anode is fitted within a flanged plate 80, to which flanges 88 are secured by machine screws 83. The flanged plate is fitted within the roof 13 of a crucible 14, the roof being provided with a passageway 89 for cooling. The plate 80 is cooled by means of an annular passageway 91, an inlet bore 90, and an exit bore 92.

Solid particles comprising an oxide, e.g., iron ore, are introduced radially into the interior 93 of the torch through the bore 72. Such particles may also include a reductant, e.g., coke, and a slag builder, e.g., calcium oxide. The heat from the arc, which may be at 5,500° C (10,000° F), causes the stabilizing gases to form a plasma and results in the sintering or melting of the oxides into a film that swirls about the walls of the anode 54 due to the vortical action of the stabilizing gases. The film slowly descends the walls of the anode 54. This relatively slow descent provides a long time for the film to be exposed to the heat of the plasma, thereby improving the degree of reduction of the ore, the power consumption per unit of ore reduced, and the reductant utilization. The oxides are reduced by contact with the reductant during the formation of the film and thereafter, i.e., during part or all of the descent of the film and, if necessary, after the effluent from the torch passes into the crucible 14.

Molten iron was produced in a plasma arc torch of the invention with a power consumption of 6.16 kilowatt-hours per kilogram of iron (2.8 kwh per pound) and a reductant conversion of 24%, whereas with similar operating conditions a power consumption of 13.3 to 19.8 kwh per kg of iron (6 to 9 kwh per pound) and reductant conversions of 8 to 11% were realized with gas-entrained particle operation.

The arc attaches directly to the film, thereby protecting the anode 54 and decreasing the rate of its erosion. In addition, the film serves as a thermal insulator and decreases the heat loss to the cooling water flowing throughout the anode 54.

The almost completely reduced material eventually leaves the wall of the anode 54 and falls into the crucible 14. The plasma penetrates the bath 82 in the crucible 14, thereby agitating the bath and further reducing any oxides that may still be present. A slag 84 may be introduced into the crucible 14 to aid in the reducing reactions.

As a specific example of the invention, three runs of Carol Lake iron ore concentrate, containing 64.8% iron, were reduced by the method of the invention. The ore was finely ground, so that 45% was minus 400 mesh and less than 1% was plus 100 mesh.

A primary stabilizing gas, comprising hydrogen, was supplied to the cathode at a rate of 62,600 – 65,000 SLH (2200 – 2300 SCFH), and a secondary stabilizing gas, comprising 111,000 – 200,000 SLH (3900 – 7000 SCFH) of hydrogen and 45,500 – 73,500 SLH (1600 – 2600 SCFH) of natural gas, was supplied to the torch between the constrictor and the anode. The finely ground iron ore was then pneumatically conveyed to the torch, by 20,000 SLH (700 SCFH) natural gas, at a rate of 6.4 – 8.2 kilograms (14 – 18 lb)/min. No slag formers or solid reductants were used.

A cathode-to-anode arc was then established in a conventional manner, and the power was adjusted to a gross level of 830 – 860 kw, the current and voltage being 480 – 500 amperes and 1525 – 1850 volts, respectively.

The refined iron contained 0.006% carbon, 0.007% phosphorus, 0.005% sulfur, 0.06% silicon, 0.007% copper, 0.14% oxygen, and 6–8 ppm hydrogen, all percentages being by weight. The gross power consumption was 3.3 kwh per kilogram (1.5 kwh per lb) of high-purity iron produced, and the reductant conversion averaged 35%. The total time of the three runs was 8.5 hours, and high-purity iron was produced at an average rate of 257 kilograms (565 lb) per hour.

We claim:
1. A method of reducing metal oxides in a plasma arc torch comprising a cathode and an anode having two ends, said method comprising:
   a. supplying a swirling vortical stabilizing gas stream adjacent to said cathode and said anode;
   b. introducing into said torch, between the ends of said anode, solid particles comprising said metal oxides, in a direction such that said particles combine with said gas stream to form a vortical path swirling in the same direction as said stabilizing gas stream, and establishing an arc between said cathode and said anode, said arc providing sufficient heat to convert said metal oxides into a film of material on the wall of said anode;
   c. reducing said metal oxides by providing a reductant in contact with them during the formation of said film and thereafter; and
   d. collecting the effluent from said torch in a receiving vessel.
2. A method as recited in claim 1, in which said solid particles include a solid reductant.
3. A method as recited in claim 2, in which said reductant is carbonaceous.
4. A method as recited in claim 1, in which said solid particles include a slag-building material.
5. A method as recited in claim 1, in which said stabilizing gas stream adjacent to said anode contains a reducing gas.

* * * * *